(12) United States Patent
Ida et al.

(10) Patent No.: US 12,427,824 B2
(45) Date of Patent: Sep. 30, 2025

(54) WORK VEHICLE

(71) Applicant: Kubota Corporation, Osaka (JP)

(72) Inventors: Yusuke Ida, Sakai (JP); Minoru Hiraoka, Sakai (JP); Junichi Ishikawa, Sakai (JP); Shunya Takase, Sakai (JP)

(73) Assignee: Kubota Corporation, Osaka (JP)

( * ) Notice: Subject to any disclaimer, the term of this patent is extended or adjusted under 35 U.S.C. 154(b) by 199 days.

(21) Appl. No.: 18/037,410

(22) PCT Filed: Dec. 1, 2021

(86) PCT No.: PCT/JP2021/044087
§ 371 (c)(1),
(2) Date: May 17, 2023

(87) PCT Pub. No.: WO2022/124158
PCT Pub. Date: Jun. 16, 2022

(65) Prior Publication Data
US 2024/0017581 A1     Jan. 18, 2024

(30) Foreign Application Priority Data

Dec. 11, 2020   (JP) ................................. 2020-206224

(51) Int. Cl.
*B60G 17/0165*   (2006.01)
*B60G 7/00*       (2006.01)
*B60G 17/015*     (2006.01)

(52) U.S. Cl.
CPC ........... *B60G 17/0165* (2013.01); *B60G 7/00* (2013.01); *B60G 17/0152* (2013.01);
(Continued)

(58) Field of Classification Search
CPC .. B60G 17/0165; B60G 7/00; B60G 17/0152; B60G 2200/18; B60G 2202/413;
(Continued)

(56) References Cited

U.S. PATENT DOCUMENTS 1,358,575 A * 11/1920 Rimailho ............... B62D 55/02
                                                            180/9.34
3,057,319 A * 10/1962 Wagner .................. B60F 3/0061
                                                            180/209
(Continued)

FOREIGN PATENT DOCUMENTS

JP          9142347 A    6/1997
JP        20201442 A    1/2020
JP      2020135622 A    8/2020

*Primary Examiner* — Carl C Staubach
*Assistant Examiner* — John D Bailey
(74) *Attorney, Agent, or Firm* — The Webb Law Firm

(57) ABSTRACT

A work vehicle includes: a body 1; a plurality of travel wheels 2 at front and back portions of the body 1 on each of left and right sides; a plurality of holder mechanisms A held by the body 1 and holding the respective travel wheels 2 in such a manner as to be capable of moving the travel wheels 2 independently of one another relative to the body 1; a detector B configured to detect a state of a travel surface; and a controller C configured to, based on the state that the detector B has detected, control the holder mechanisms A to move the travel wheels 2 relative to the body 1.

11 Claims, 10 Drawing Sheets

(52) U.S. Cl.
CPC .... *B60G 2200/18* (2013.01); *B60G 2202/413* (2013.01); *B60G 2204/62* (2013.01); *B60G 2300/07* (2013.01); *B60G 2400/821* (2013.01); *B60G 2400/823* (2013.01); *B60G 2500/30* (2013.01); *B60G 2600/182* (2013.01); *B60G 2800/01* (2013.01); *B60G 2800/914* (2013.01)

(58) Field of Classification Search
CPC ............ B60G 2204/62; B60G 2300/07; B60G 2400/821; B60G 2400/823; B60G 2500/30; B60G 2600/182; B60G 2800/01; B60G 2800/914
USPC .......................................................... 701/37
See application file for complete search history.

(56) References Cited

U.S. PATENT DOCUMENTS

| | | | | |
|---|---|---|---|---|
| 3,414,072 A * | 12/1968 | Hodges, Jr. | ............... | F41H 7/02 280/43.23 |
| 3,609,804 A * | 10/1971 | Morrison | ............... | B62D 55/02 446/457 |
| 3,809,004 A * | 5/1974 | Leonheart | ............. | B60F 3/0007 180/21 |
| 4,558,758 A * | 12/1985 | Littman | ................ | B66F 11/046 182/2.11 |
| 4,804,203 A * | 2/1989 | Glab | ................ | B60G 17/01908 280/5.514 |
| 4,932,491 A * | 6/1990 | Collins, Jr. | ............ | B62D 49/08 280/5.2 |
| 4,993,912 A * | 2/1991 | King | ...................... | B62D 61/12 89/929 |
| 5,183,127 A * | 2/1993 | Kageyama | .............. | B60T 8/175 180/197 |
| 6,098,994 A * | 8/2000 | Kunishima | .......... | B60G 17/016 280/5.514 |
| 7,237,779 B2 * | 7/2007 | Kondo | .................... | B60P 1/027 280/6.157 |
| 7,338,335 B1 * | 3/2008 | Messano | ........... | B60H 1/00428 903/903 |
| 7,427,072 B2 * | 9/2008 | Brown | ............... | B60G 17/0157 280/5.52 |
| 7,643,944 B2 * | 1/2010 | Spratte | ................... | B60G 7/005 33/534 |
| 8,112,199 B2 * | 2/2012 | Poilbout | .................. | B60G 3/20 280/5.502 |
| 8,725,379 B2 * | 5/2014 | Murata | ................. | B60W 10/06 701/37 |
| 10,065,474 B2 * | 9/2018 | Trangbaek | ......... | B60G 17/0165 |
| 10,351,162 B1 * | 7/2019 | Katzourakis | ........... | B62D 5/001 |
| 11,618,293 B2 * | 4/2023 | Ohno | ............... | B60G 17/0165 701/37 |
| 11,660,925 B2 * | 5/2023 | Doerksen | ............. | B62D 61/065 701/37 |
| 2004/0251651 A1 * | 12/2004 | Yamamoto | ........... | B60G 17/021 280/124.128 |
| 2005/0145428 A1 * | 7/2005 | Chun | ................. | B60G 17/0157 180/209 |
| 2006/0287791 A1 * | 12/2006 | Boon | ................... | B60G 21/073 701/37 |
| 2007/0198149 A1 * | 8/2007 | Nishioka | ............... | B60G 17/015 340/425.5 |
| 2007/0203626 A1 * | 8/2007 | Rittenhouse | ........... | B60G 11/27 701/37 |
| 2008/0029987 A1 * | 2/2008 | Sugiyama | ............ | B60K 17/356 280/124.106 |
| 2008/0179116 A1 * | 7/2008 | Ikenoya | ............... | B60K 17/356 180/63 |
| 2008/0185806 A1 * | 8/2008 | Zuge | ........................ | B60G 3/20 280/124.136 |
| 2008/0284118 A1 * | 11/2008 | Venton-Walters | ......................... | B62D 49/0678 280/6.154 |
| 2009/0012688 A1 * | 1/2009 | Hattori | ................ | B60W 40/064 701/79 |
| 2009/0132122 A1 * | 5/2009 | Kim | ....................... | B60G 17/06 188/322.19 |
| 2009/0171530 A1 * | 7/2009 | Bousfield | ................. | B62J 17/10 701/37 |
| 2009/0184484 A1 * | 7/2009 | Gerrard | .................... | B60G 3/10 280/124.144 |
| 2009/0254249 A1 * | 10/2009 | Ghoneim | ........... | B60G 17/0162 701/37 |
| 2010/0133018 A1 * | 6/2010 | Hertema | ................ | A61G 5/066 180/6.48 |
| 2010/0307842 A1 * | 12/2010 | Oriet | ....................... | B60T 1/062 180/6.24 |
| 2011/0029197 A1 * | 2/2011 | Uenuma | ............... | B60G 17/018 318/135 |
| 2014/0008141 A1 * | 1/2014 | Kageyama | ................ | B60G 3/20 180/400 |
| 2014/0049013 A1 * | 2/2014 | Dehmel | ................. | B60G 15/10 267/64.28 |
| 2014/0116243 A1 * | 5/2014 | Six | ........................ | B60G 17/056 91/418 |
| 2014/0131960 A1 * | 5/2014 | Moore | ............... | B60G 17/0165 280/5.514 |
| 2014/0131961 A1 * | 5/2014 | Moore | ............... | B60G 15/062 280/6.157 |
| 2014/0190156 A1 * | 7/2014 | Reybrouck | ............ | B60G 15/08 60/431 |
| 2015/0028551 A1 * | 1/2015 | Reybrouck | ........ | B60G 17/0272 280/5.508 |
| 2015/0046033 A1 * | 2/2015 | Yoshimi | ..................... | G01P 3/00 701/37 |
| 2015/0105979 A1 * | 4/2015 | Hilderband | ........ | B60G 17/0162 701/38 |
| 2015/0151778 A1 * | 6/2015 | Kageyama | ............. | B62D 5/006 701/41 |
| 2015/0343874 A1 * | 12/2015 | Kurata | ................. | B60G 17/018 701/29.1 |
| 2016/0023531 A1 * | 1/2016 | Göhrle | .................... | B60G 17/06 701/37 |
| 2016/0052359 A1 * | 2/2016 | Matayoshi | ........... | B60K 7/0007 280/124.145 |
| 2016/0140861 A1 * | 5/2016 | Tischer | .................... | G09B 9/04 434/69 |
| 2016/0144682 A1 * | 5/2016 | Lachica | ........... | B60G 17/01941 280/5.507 |
| 2016/0288845 A1 * | 10/2016 | Honda | .................... | B60K 13/04 |
| 2017/0100980 A1 * | 4/2017 | Tsuda | ................. | B60G 17/0165 |
| 2018/0079271 A1 * | 3/2018 | Zwanzger | ............... | B60G 17/08 |
| 2018/0093543 A1 * | 4/2018 | Hadi | ................. | B60G 17/0185 |
| 2019/0077212 A1 * | 3/2019 | Imaoka | ............... | B60G 17/0161 |
| 2019/0176811 A1 * | 6/2019 | Cho | ................. | B60W 10/119 |
| 2020/0130048 A1 * | 4/2020 | Hosoi | ..................... | B60G 7/00 |
| 2020/0290418 A1 * | 9/2020 | Wallgren | ................ | B60G 7/006 |
| 2020/0331317 A1 * | 10/2020 | Nasu | ................ | B60W 10/184 |
| 2021/0094376 A1 * | 4/2021 | Smith | .................. | G06Q 10/087 |
| 2021/0146742 A1 * | 5/2021 | Lee | ..................... | B60G 17/0165 |
| 2021/0163089 A1 * | 6/2021 | Ishikawa | ............ | B60G 17/0162 |
| 2021/0372499 A1 * | 12/2021 | Slusarczyk | ............. | F16F 9/50 |
| 2022/0016949 A1 * | 1/2022 | Graus | .................... | B60G 17/08 |
| 2022/0097473 A1 * | 3/2022 | Kasuya | ............... | B60G 17/0182 |
| 2022/0266648 A1 * | 8/2022 | Bulling | ................ | B60G 11/14 |
| 2023/0286346 A1 * | 9/2023 | Yamazaki | ............ | B60G 17/018 |
| 2023/0294473 A1 * | 9/2023 | Ali | ..................... | B60G 17/0161 701/37 |
| 2023/0398978 A1 * | 12/2023 | Lewandowski | ....... | B60W 30/02 |

* cited by examiner

Fig.4
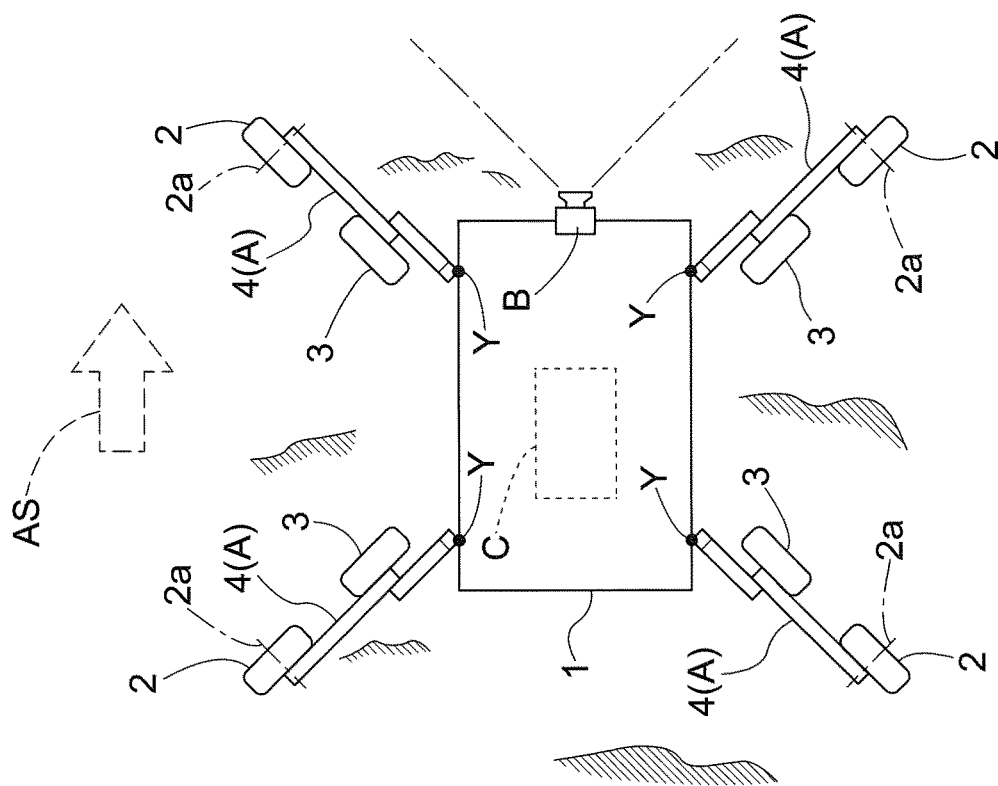
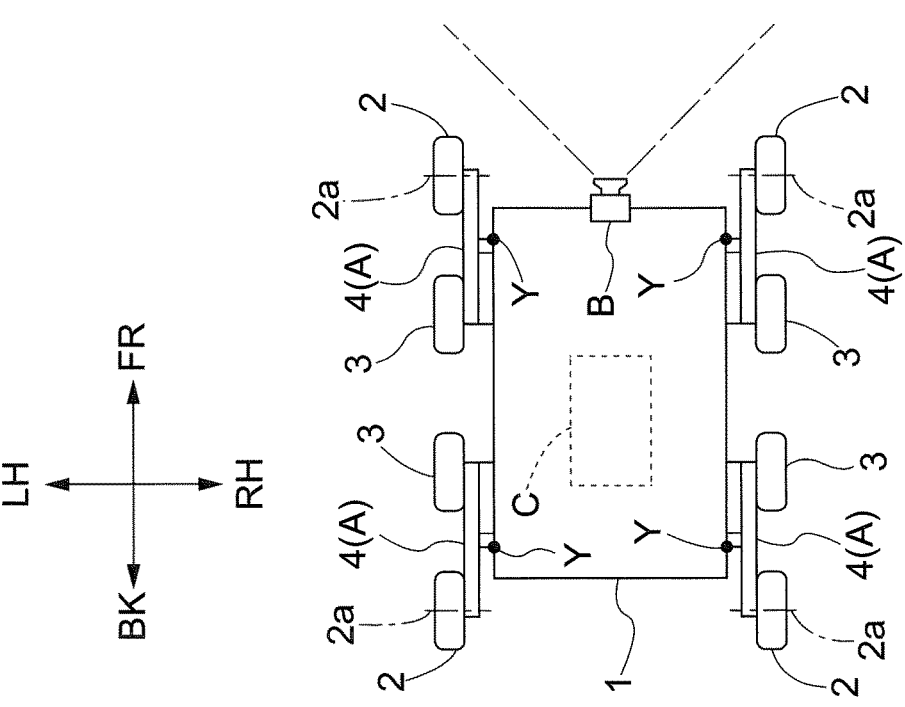

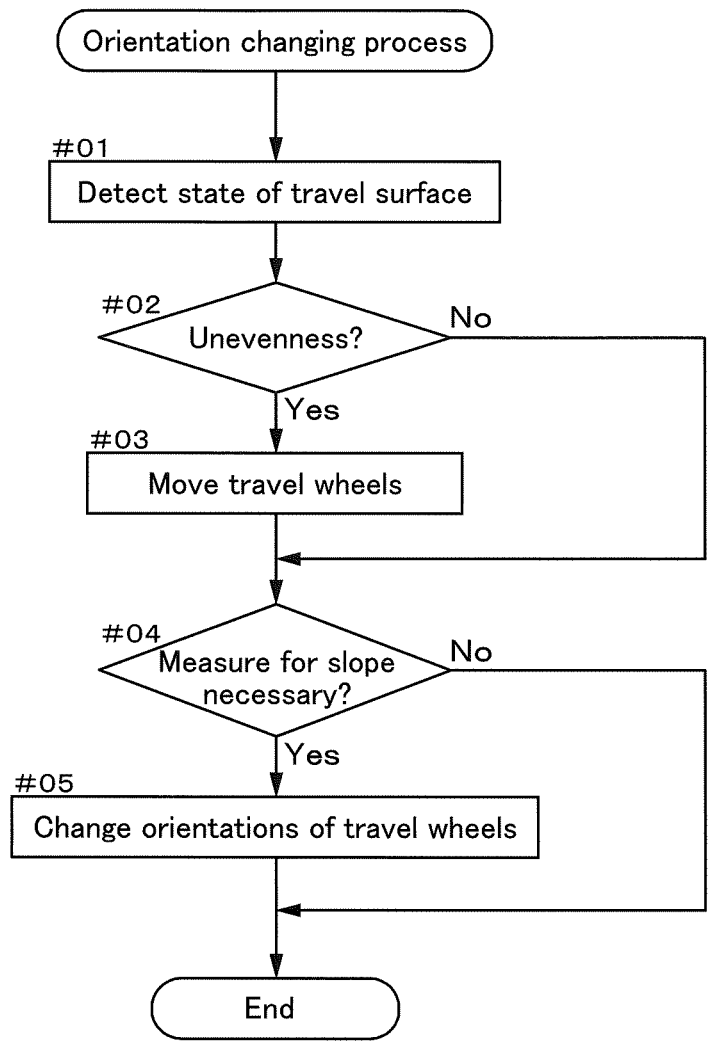

WORK VEHICLE

CROSS-REFERENCE TO RELATED APPLICATIONS

This application is the United States national phase of International Application No. PCT/JP2021/044087 filed Dec. 1, 2021, and claims priority to Japanese Patent Application No. 2020-206224 filed Dec. 11, 2020, the disclosures of which are hereby incorporated by reference in their entireties.

BACKGROUND OF THE INVENTION

Field of the Invention

The present invention relates to a work vehicle.

Description of Related Art

Patent Literature 1 discloses a rover designed to travel on rough terrain. The rover includes a body and four travel wheels each held by the body with a link mechanism in-between. The link mechanism is provided with an electric motor, and is drivable by means of the driving force from the electric motor to bend and stretch.
Patent Literature 1:
Japanese Unexamined Patent Application Publication, Tokukaihei, No. H9-142347

The rover disclosed in Patent Literature 1 includes no means for detecting the state of the travel surface. Further, Patent Literature 1 fails to disclose a specific method or arrangement of how to operate the link mechanisms for the rover to travel on rough terrain.

SUMMARY OF THE INVENTION

It is an object of the present invention to provide a work vehicle with improved roadability and brake performance on rough terrain To attain the above object, a work vehicle of the present invention includes: a body; a plurality of travel wheels at front and back portions of the body on each of left and right sides; a plurality of holder mechanisms held by the body and holding the respective travel wheels in such a manner as to be capable of moving the travel wheels independently of one another relative to the body; a detector configured to detect a state of a travel surface; and a controller configured to, based on the state that the detector has detected, control the holder mechanisms to move the travel wheels relative to the body.

With the above configuration, the controller moves the travel wheels on the basis of the state of the travel wheel that the detector has detected. This allows each travel wheel to be positioned suitably for the state of the travel surface, and thereby allows the work vehicle to have improved roadability and brake performance on rough terrain.

The work machine may preferably be configured such that the controller controls the holder mechanisms in such a manner that the body becomes apart from the travel wheels by a distance in an up-down direction relative to the vehicle in response to the detector detecting an unevenness on the travel surface, the distance being larger as the unevenness is larger.

With the above configuration, the body becomes apart from the travel wheels, hence from the travel surface, by a larger distance in the up-down direction in response to the detector detecting a larger unevenness on the travel surface. This prevents the body from coming into contact with the travel surface, and thereby allows the work vehicle to have improved roadability on rough terrain.

The work machine may preferably further include: the controller controls the holder mechanisms in such a manner that the body becomes apart from the travel wheels by a distance in the up-down direction relative to the vehicle in response to the detector detecting an unevenness on the travel surface, the distance being larger than the unevenness.

With the above configuration, the body becomes apart from the travel wheels, hence from the travel surface, by a distance in the up-down direction which distance is larger than an unevenness on the travel surface. This more reliably prevents the body from coming into contact with the travel surface, and thereby allows the work vehicle to have further improved roadability on rough terrain.

The work machine may preferably further include: the controller controls the holder mechanisms in such a manner that the body becomes apart from the travel wheels by a distance in a front-back direction relative to the vehicle in response to the detector detecting an unevenness on the travel surface, the distance being larger as the unevenness is larger.

With the above configuration, the body becomes apart from the travel wheels by a larger distance in the front-back direction, in other words, the work vehicle has a larger wheelbase, in response to the detector detecting a larger unevenness on the travel surface. This allows the work vehicle to be more stable against a front-back swing, and thereby allows the work vehicle to have improved roadability on rough terrain.

The work machine may preferably further include: the controller controls the holder mechanisms in such a manner that the body becomes apart from the travel wheels by a distance in a left-right direction relative to the vehicle in response to the detector detecting an unevenness on the travel surface, the distance being larger as the unevenness is larger.

With the above configuration, the body becomes apart from the travel wheels by a larger distance in the left-right direction, in other words, the work vehicle has a larger tread width, in response to the detector detecting a larger unevenness on the travel surface. This allows the work vehicle to be more stable against a left-right swing, and thereby allows the work vehicle to have improved roadability and brake performance on rough terrain.

The work machine may preferably further include: the holder mechanisms are each configured to change a direction of a rotation axis of a corresponding one of the travel wheels independently, and the controller controls the holder mechanisms in such a manner that the respective rotation axes of the travel wheels are not orthogonal to a sloping direction of the travel surface.

With the respective rotation axes of the travel wheels orthogonal to the sloping direction of the travel surface, the travel wheels will be aligned with the sloping direction. This will make it difficult to stop or travel slowly on the sloped travel surface. The above configuration prevents the travel wheels from being aligned with the sloping direction of the travel surface, and thereby allows the work vehicle to easily stop or travel slowly on the sloped travel surface.

The work machine may preferably further include: the detector is a camera configured to capture an image of the travel surface.

With the above configuration, the detection of the state of the travel surface is based appropriately on an image that the camera has captured of the travel surface. This allows the travel wheels to be positioned more appropriately, and thereby allows the work vehicle to have further improved roadability on rough terrain.

The work machine may preferably further include: the holder mechanisms each include: a bendable link mechanism; and an orientation changer configured to change an orientation of the bendable link mechanism independently, the bendable link mechanism has a leading end provided with a corresponding one of the travel wheels, and the controller controls the orientation changers.

With the above configuration, the holder mechanisms for moving the respective travel wheels each include a bendable link mechanism and an orientation changer. This allows the holder mechanisms to be simple and sturdy in a preferable way.

The work machine may preferably further include: a plurality of hydraulic motors each disposed at the leading end of a corresponding one of the bendable link mechanisms and configured to drive a corresponding one of the travel wheels, wherein the orientation changers each include a hydraulic cylinder.

The above configuration uses hydraulic power to both drive the travel wheels and orient the holder mechanisms. This allows the travel wheels and the holder mechanisms to be controlled finely and also allows the work vehicle to be less expensive in a preferable way.

The work machine may preferably further include: an obstacle detector configured to detect an obstacle forward in a direction in which the work vehicle is traveling, wherein the holder mechanisms are each configured to change a direction of a rotation axis of a corresponding one of the travel wheels independently, and the controller is configured to, in response to the obstacle detector detecting an obstacle forward in the direction in which the work vehicle is traveling, control the holder mechanisms in such a manner that the respective rotation axes are not orthogonal to the direction in which the work vehicle is traveling.

The above configuration allows for improvement in the brake performance and stability of the work vehicle when it brakes suddenly in response to detecting an obstacle forward in the direction in which the work vehicle is traveling.

To attain the above object, a work vehicle of the present invention includes: a body; a plurality of travel wheels at front and back portions of the body on each of left and right sides; a plurality of holder mechanisms held by the body and holding the respective travel wheels in such a manner as to be capable of moving (i) the travel wheels independently of one another relative to the body and (ii) respective rotation axes of the travel wheels independently of one another; an obstacle detector configured to detect an obstacle forward in a direction in which the work vehicle is traveling; and a controller configured to, in response to the obstacle detector detecting an obstacle forward in the direction in which the work vehicle is traveling, control the holder mechanisms in such a manner that the respective rotation axes are not orthogonal to the direction in which the work vehicle is traveling.

The above configuration allows for improvement in the brake performance and stability of the work vehicle when it brakes suddenly in response to detecting an obstacle forward in the direction in which the work vehicle is traveling.

BRIEF DESCRIPTION OF THE DRAWINGS

FIG. 4 is a diagram schematically illustrating a work vehicle and how it operates.
FIG. 12 is a flowchart of an orientation changing process.

DESCRIPTION OF THE INVENTION

Figure 1:
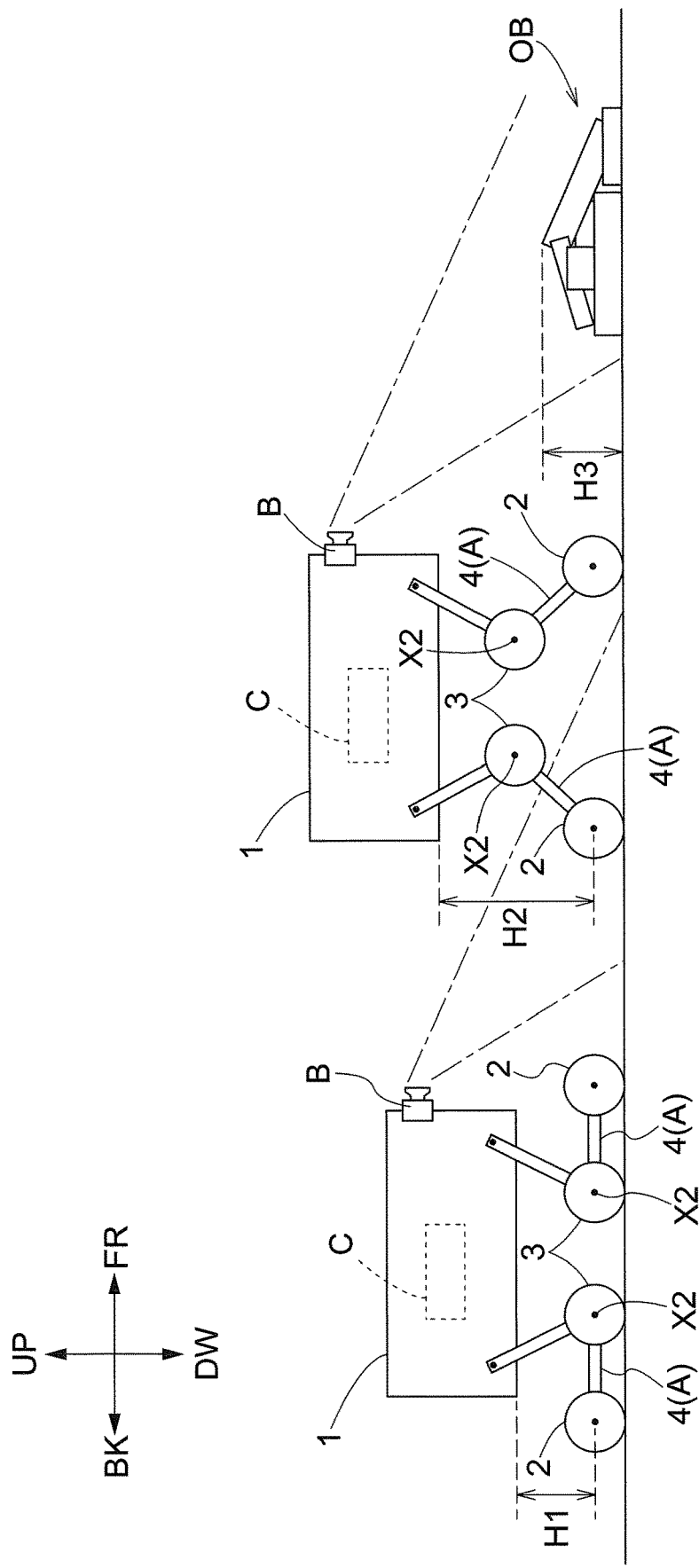
FIG. 1 is a diagram schematically illustrating a work vehicle and how it operates.

The description below deals with a work vehicle as an embodiment of the present invention with reference to drawings. The present invention is, however, not limited to the embodiment below, and may be altered variously within its scope. The description below uses (i) terms such as "front" to refer to the side indicated by arrow FW in the drawings, (ii) terms such as "back" to refer to the side indicated by arrow BK, (iii) terms such as "right" to refer to the side indicated by arrow RH, (iv) terms such as "left" to refer to the side indicated by arrow LH, (v) terms such as "upward" to refer to the side indicated by arrow UP, and (vi) terms such as "downward" to refer to the side indicated by arrow DW. The description below also uses (i) expressions such as "front-back direction relative to the vehicle" to refer to the direction indicated by arrows FW and BK, (ii) expressions such as "left-right direction relative to the vehicle" to refer to the direction indicated by arrows RH and LH, and (iii) expressions such as "up-down direction" to refer to the direction indicated by arrows UP and DW.

[Outline of Work Vehicle and How Work Vehicle Operates]

FIGS. 1 to 4 schematically illustrate a work vehicle and how it operates. The work vehicle includes a body 1, a plurality of travel wheels 2, a plurality of holder mechanisms A, a detector B (which is an example of the "detector" and the "obstacle detector"), and a controller C.

The travel wheels 2 are disposed at front and back portions of the body 1 on the left and right sides. The work vehicle as the present embodiment includes four travel wheels 2: one at a front portion on the left, one at a front portion on the right, one at a back portion on the left, and one at a back portion on the right.

The holder mechanisms A are held by the body 1 and hold the travel wheels 2 in such a manner as to be capable of independently moving the travel wheels 2 relative to the body 1. The work vehicle as the present embodiment includes four holder mechanisms A: one at a front portion on the left, one at a front portion on the right, one at a back portion on the left, and one at a back portion on the right.

Specifically, the holder mechanisms A each include a bendable link mechanism 4 and an orientation changer D. The orientation changer D is configured to change the orientation of its corresponding bendable link mechanism 4 independently. The orientation changer D for the present embodiment includes hydraulic cylinders (detailed later).

The bendable link mechanism 4 has a leading end provided with a travel wheel 2 and a hydraulic motor 6 configured to control the travel wheel 2 (detailed later).

As illustrated in FIG. 4, the holder mechanisms A are each configured to change the direction of the rotation axis 2a of the corresponding travel wheel 2 independently. Specifically, the holder mechanisms A are each swingable about a vertical axis Y. A swing of a holder mechanism A also causes its corresponding travel wheel 2 to swing about the vertical axis Y in such a manner as to change the direction of its rotation axis 2a.

The work vehicle as the present embodiment includes a plurality of auxiliary wheels 3. The auxiliary wheels 3 for the present embodiment are each disposed at an intermediate portion (joint) of the corresponding bendable link mechanism 4.

The detector B is configured to detect the state of the travel surface and any obstacle forward in the direction in which the work vehicle is traveling. The detector B for the present embodiment is in the form of a camera configured to capture an image of the travel surface.

The controller C is configured to control the holder mechanisms A, based on the state of the travel surface that the detector B has detected, to move the travel wheels 2 relative to the body 1. The controller C controls the orientation changers D. Specifically, the controller C supplies operating oil to each orientation changer D (which includes hydraulic cylinders) and the corresponding hydraulic motor 6 and adjusts the flow rate and pressure of the operating oil to control how the orientation changer D and the hydraulic motor 6 operate.

The controller C is also configured to, in response to the detector B detecting an obstacle forward in the direction in which the work vehicle is traveling, control the holder mechanisms A in such a manner that the respective rotation axes 2a of the travel wheels 2 are not orthogonal to the direction in which the work vehicle is traveling.

As illustrated in FIG. 1, the controller C controls the holder mechanisms A in such a manner that the body 1 becomes apart from the travel wheels 2 by a larger distance in the up-down direction relative to the vehicle in response to the detector B detecting a larger unevenness on the travel surface.

The description below deals with the above control in detail. The work vehicle travels while causing the detector B to detect the state of the travel surface. The left portion of the drawing illustrates a smooth travel surface with only little unevenness. In this case, the controller C controls the holder mechanisms A in such a manner that the body 1 is apart from the travel wheels 2 by a distance H1 in the up-down direction.

In response to the detector B detecting an obstacle OB on the field surface, that is, a large unevenness on the travel surface (see the right portion of the drawing), the controller C controls the holder mechanisms A in such a manner that the body 1 is apart from the travel wheels 2 by a distance H2 in the up-down direction, the distance H2 being larger than the distance H1. The controller C controls the holder mechanisms A in particular in such a manner that the body 1 is apart from the travel wheels 2 by a distance H2 larger than the size of the unevenness on the travel surface (that is, the height H3 of the obstacle OB). The controller C, in other words, controls the holder mechanisms A in such a manner that the body 1 is apart from the travel wheels 2 by a distance in the up-down direction relative to the vehicle which distance is larger than the size of an unevenness on the travel surface which unevenness the detector B has detected. This allows the body 1 to be apart from the travel surface by a larger distance in the up-down direction, and thereby improves the roadability.

Figure 2:
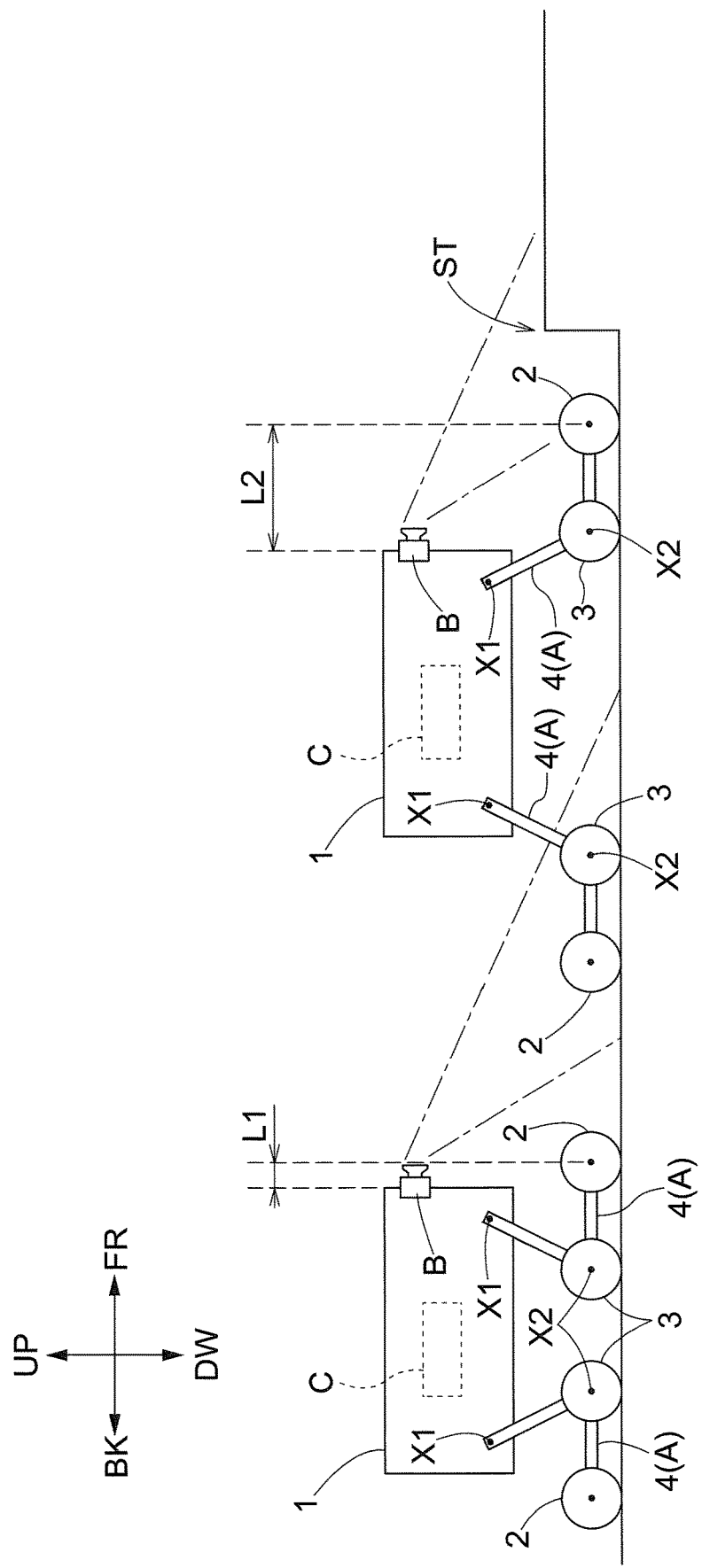
FIG. 2 is a diagram schematically illustrating a work vehicle and how it operates.

As illustrated in FIG. 2, the controller C controls the holder mechanisms A in such a manner that the body 1 becomes apart from the travel wheels 2 by a larger distance in the front-back direction relative to the vehicle in response to the detector B detecting a larger unevenness on the travel surface.

The description below deals with the above control in detail. The work vehicle travels while causing the detector B to detect the state of the travel surface. The left portion of the drawing illustrates a smooth travel surface with only little unevenness. In this case, the controller C controls the holder mechanisms A in such a manner that the body 1 is apart from the travel wheels 2 by a distance L1 in the front-back direction relative to the vehicle.

In response to the detector B detecting a step ST on the travel surface, that is, a large unevenness on the travel surface (see the right portion of the drawing), the controller C controls the holder mechanisms A in such a manner that the body 1 is apart from the travel wheels 2 by a distance L2 in the front-back direction relative to the vehicle, the distance L2 being larger than the distance L1. This increases the so-called wheelbase, and thereby improves the roadability.

Figure 3:
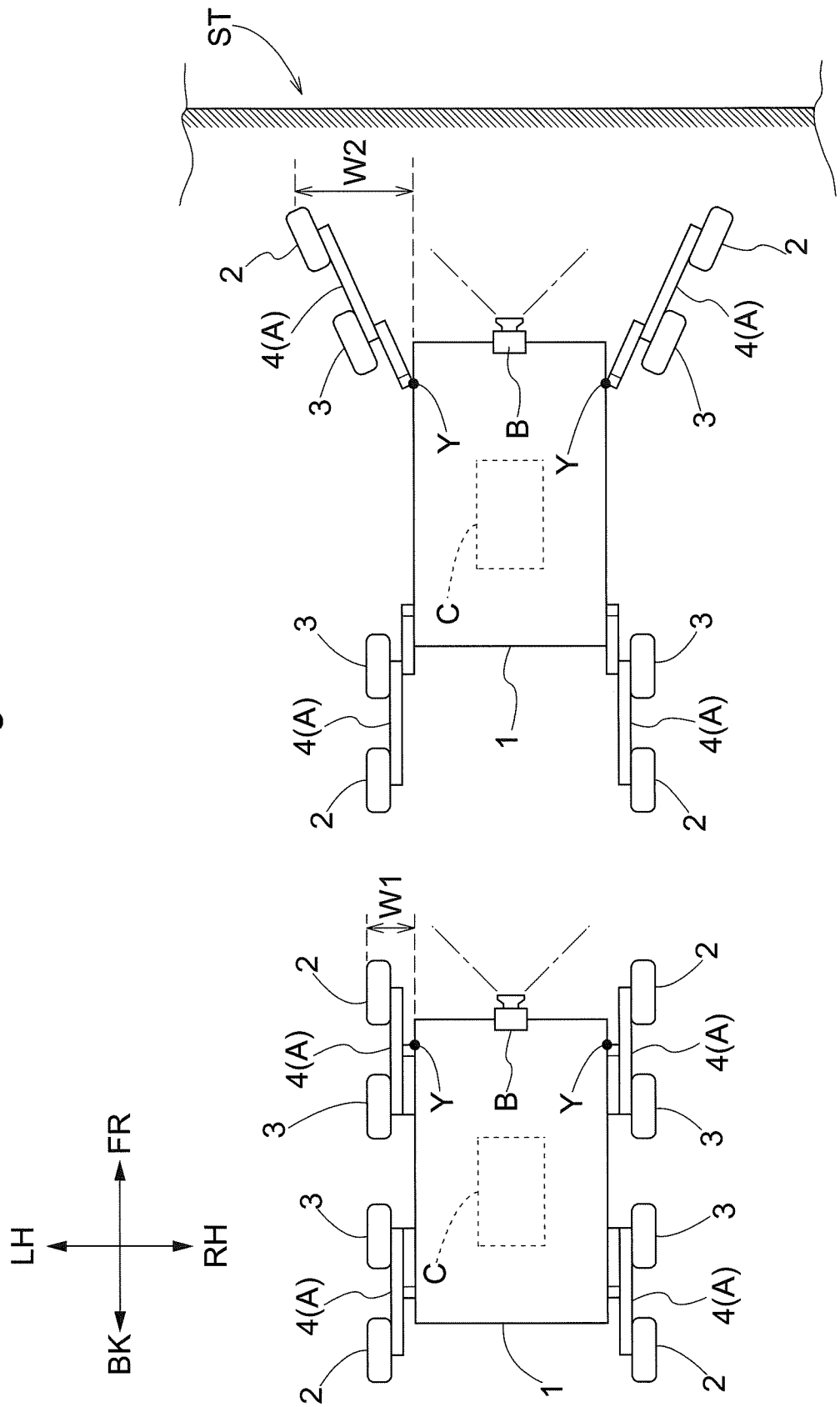
FIG. 3 is a diagram schematically illustrating a work vehicle and how it operates.

As illustrated in FIG. 3, the controller C controls the holder mechanisms A in such a manner that the body 1 becomes apart from the travel wheels 2 by a larger distance in the left-right direction relative to the vehicle in response to the detector B detecting a larger unevenness on the travel surface.

The description below deals with the above control in detail. The work vehicle travels while causing the detector B to detect the state of the travel surface. The left portion of the drawing illustrates a smooth travel surface with only little unevenness. In this case, the controller C controls the holder mechanisms A in such a manner that the body 1 is apart from the travel wheels 2 by a distance W1 in the left-right direction relative to the vehicle.

In response to the detector B detecting a step ST on the travel surface, that is, a large unevenness on the travel surface (see the right portion of the drawing), the controller C controls the holder mechanisms A in such a manner that the body 1 is apart from the travel wheels 2 by a distance W2 in the left-right direction relative to the vehicle, the distance W2 being larger than the distance W1. This increases the so-called tread width, and thereby improves the roadability.

As illustrated in FIG. 4, the controller C controls the holder mechanisms A in such a manner that the respective rotation axes 2a of the travel wheels 2 are not orthogonal to the sloping direction AS of the travel surface.

The description below deals with the above control in detail. The work vehicle travels while causing the detector B to detect the state of the travel surface. The left portion of the drawing illustrates a smooth, level travel surface with only a small slope. In this case, the controller C controls the holder mechanisms A in such a manner that the respective rotation axes 2a of the travel wheels 2 are orthogonal to the direction in which the work vehicle is traveling.

In response to the detector B detecting a sloping surface SL forward, that is, a large slope on the travel surface (see the right portion of the drawing), the controller C controls the holder mechanisms A in such a manner that the respective rotation axes 2a of the travel wheels 2 are not orthogonal to the sloping direction AS of the travel surface. Specifically, the controller C causes each holder mechanism A to swing about the vertical axis Y to change the direction of the rotation axis 2a of the corresponding travel wheel 2 so that the rotation axis 2a is not orthogonal to the sloping direction AS. This prevents the travel wheels 2 from being aligned with the sloping direction AS of the travel surface, and thereby allows the work vehicle to easily stop or travel slowly on a sloped travel surface.

The controller C may control the holder mechanisms A in such a manner that the respective rotation axes 2a of the travel wheels 2 are not orthogonal to the direction in which the work vehicle is traveling, in response to the detector B detecting an obstacle (for example, a rock, a fallen tree, an animal, or a person) forward and the controller C determining that the work vehicle needs to brake suddenly even if the travel surface forward is flat. The controller C may, in this case, control the holder mechanisms A in such a manner as to, for instance, adjust the tread width as illustrated in the right half of FIG. 4 so that the two bendable link mechanisms 4 on either of the front and back sides are in a V shape as viewed from above. This improves the brake performance and the stability under braking. The controller C determines whether the work vehicle needs to brake suddenly, depending on, for example, the traveling speed of the work vehicle and the distance between the work vehicle and the obstacle.

[Detailed Configuration of Work Vehicle]

The description below deals with how the work vehicle is configured in detail, with reference to FIGS. 5 to 10. The work vehicle, as described above, includes a body 1, a plurality of travel wheels 2, a plurality of holder mechanisms A, a detector B, and a controller C.

[Body]

Figure 5:
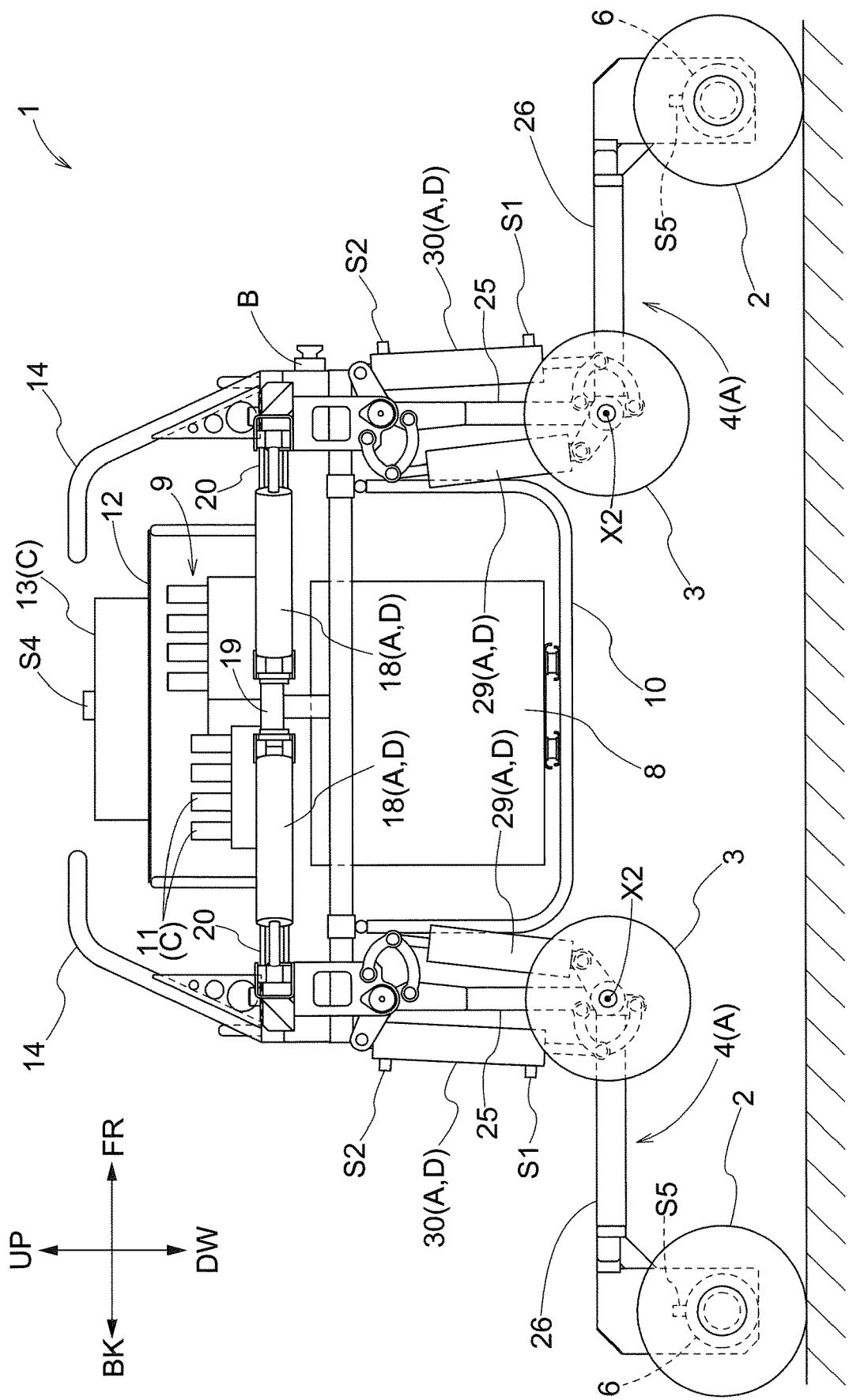
FIG. 5 is a side view of a work vehicle in its entirety.
Figure 6:
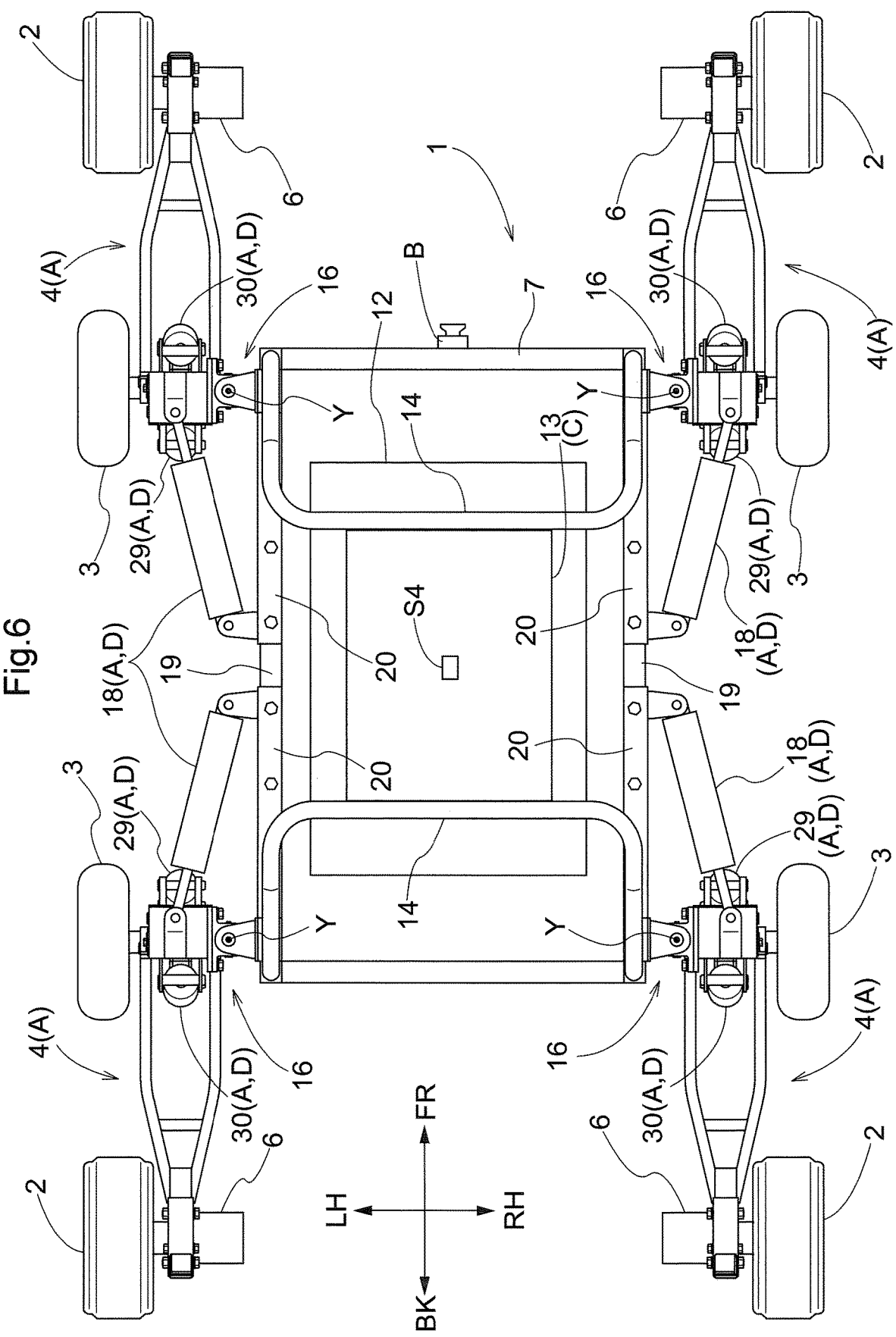
FIG. 6 is a plan view of a work vehicle in its entirety.

As illustrated in FIGS. 5 and 6, the body 1 includes a rectangular body frame 7, a hydraulic pressure source 8, a valve mechanism 9, a support mount 10, hydraulic pressure control valves 11, a casing 12, and an ECU 13, and is provided with the detector B.

The hydraulic pressure source 8 is, for example, a hydraulic pump drivable by driving means (not illustrated in the drawings) such as an engine or an electric motor. The hydraulic pressure source 8 is supported by the support mount 10, which is disposed under and coupled to the body frame 7. The hydraulic pressure source 8 is at a lower middle portion of the body 1. The hydraulic pressure source 8 is configured to supply operating oil to each orientation changer D through the valve mechanism 9. Although this is not illustrated in the drawings, detaching the support mount 10 from the body frame 7 allows the hydraulic pressure source 8 and the support mount 10 as integrally coupled to each other to be slid sideways out of the body 1 for removal. Subsequently sliding the hydraulic pressure source 8 and the support mount 10 sideways into the body 1 allows the support mount 10 to be attached to the body frame 7 again.

The valve mechanism 9 is supported by the body frame 7 and includes a plurality of hydraulic pressure control valves 11 configured to supply operating oil to and exhaust operating oil from each orientation changer D (which includes hydraulic cylinders) and the hydraulic motor 6 and to, for example, adjust the flow rate and pressure of the operating oil. The valve mechanism 9 is covered by the casing 12 from above, and operates under control of the electronic control unit (ECU) 13, which is disposed on and above the casing 12. The hydraulic pressure control valves 11 and the ECU 13 constitute the controller C.

The work vehicle includes two outer frames 14 disposed over the body frame 7 and configured to protect components such as the valve mechanism 9 in the casing 12 and the ECU 13 on the casing 12 in such events as a rollover of the body 1. The outer frames 14 are each in the form of a bar curved in a substantial U shape in a plan view and in a substantial L shape in a side view. One of the outer frames 14 has a left end and a right end both fixedly attached to a front end portion of the body frame 7, whereas the other outer frame 14 has a left end and a right end both fixedly attached to a back end portion of the body frame 7. The outer frames 14 are oriented in such a manner that their respective upper portions are close to each other to cover components such as the valve mechanism 9 and the ECU 13.

As mentioned above, the detector B is in the form of a camera configured to capture an image of the travel surface. The detector B is disposed at a front end portion of the body 1 and supported by the body frame 7. The detector B is configured to capture an image of the travel surface over time to generate image data and transmit the image data to the ECU 13.

[Holder Mechanisms]

As described above, the holder mechanisms A each include a bendable link mechanism 4 and an orientation changer D.

The bendable link mechanisms 4 each hold a corresponding one of the four travel wheels 2 in such a manner that the travel wheel 2 is capable of being lifted and lowered relative to the body 1 independently. The bendable link mechanisms 4 are each held by the body frame 7 with a turning mechanism 16 in-between in such a manner that the bendable link mechanism 4 is rotatable about a vertical axis Y.

The turning mechanisms 16 each include a body-side holder 17 and a turning hydraulic cylinder 18. The body-side holder 17 (see FIGS. 7 and 8) is coupled to the body frame 7 and holds the corresponding bendable link mechanism 4 in such a manner that the bendable link mechanism 4 is swingable. The turning hydraulic cylinder (hereinafter referred to as "turning cylinder") 18 is configured to turn the corresponding bendable link mechanism 4.

Figure 7:
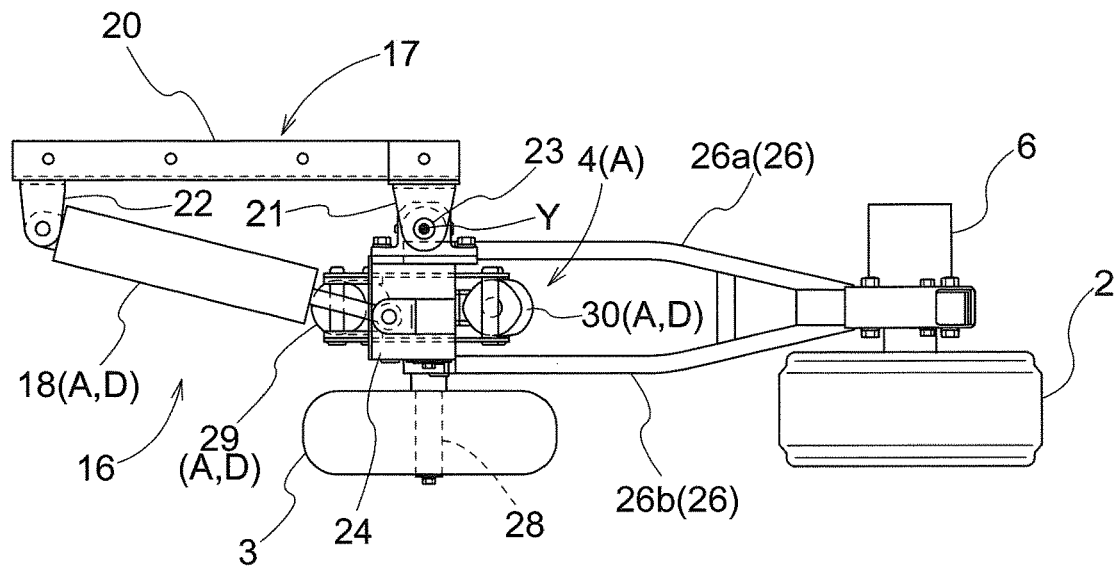
FIG. 7 is a plan view of a bendable link mechanism.
Figure 8:
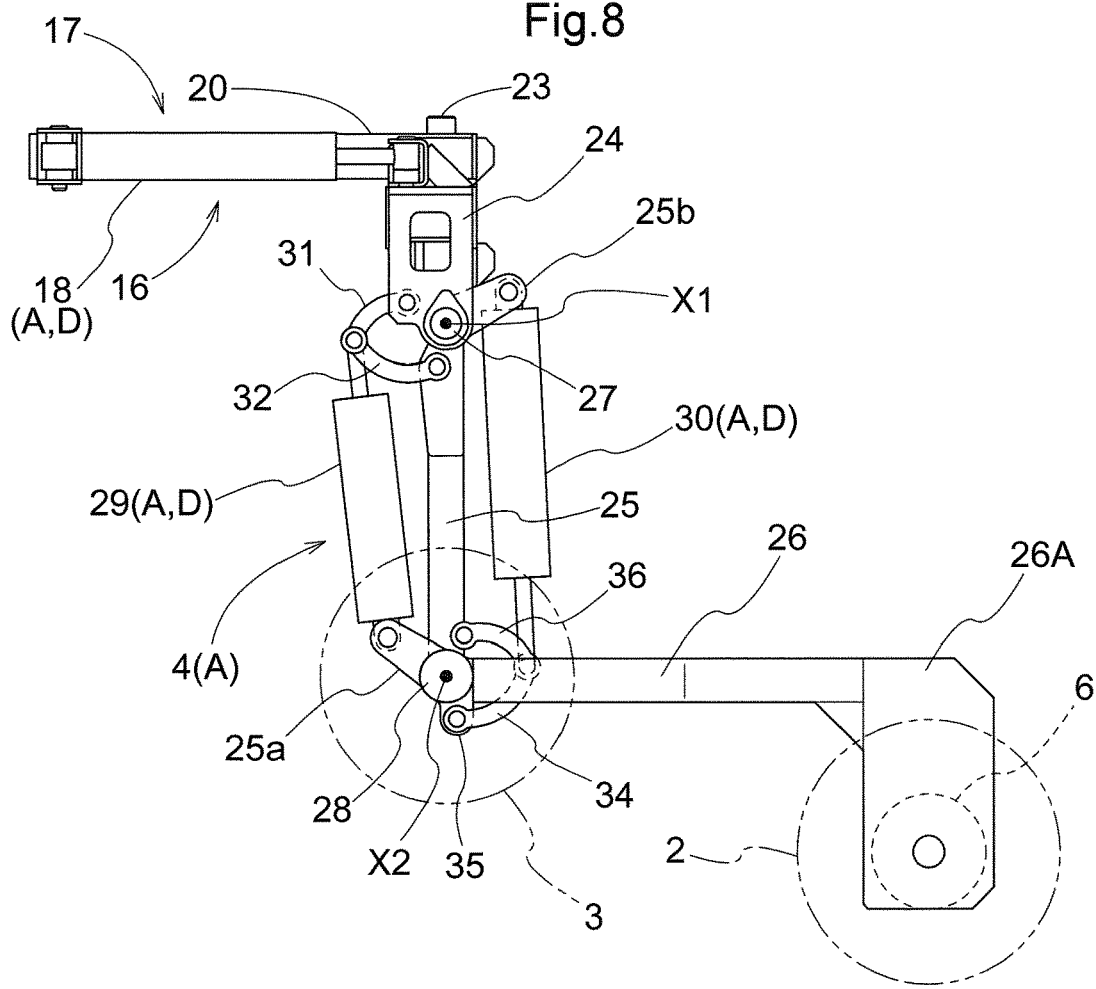
FIG. 8 is a side view of a bendable link mechanism.

As illustrated in FIGS. 7 and 8, each body-side holder 17 includes a coupler 20, an outer pivotally holding bracket 21, an inner pivotally holding bracket 22, and a vertical rotary shaft 23. The body-side holder 17 holds the corresponding bendable link mechanism 4 in such a manner that the bendable link mechanism 4 is rotatable about the vertical axis Y of the rotary shaft 23.

The coupler 20 holds a frame member 19 of the body frame 7 from laterally outward to be engaged with the frame member 19, and is detachably bolted to the frame member 19. The frame member 19 is an angular pipe extending in the front-back direction and disposed at a lateral portion of the body frame 7.

The outer pivotally holding bracket 21 is at an outer portion of the coupler 20 relative to the front-back direction of the body, whereas the inner pivotally holding bracket 22 is at an inner portion of the coupler 20 relative to the front-back direction of the body. The rotary shaft 23 is held by the outer pivotally holding bracket 21.

The bendable link mechanisms 4 each include a base end 24, a first link 25, and a second link 26. The base end 24 is held by the corresponding body-side holder 17 in such a manner as to be fixed in position in the up-down direction and rotatable about the vertical axis Y. The first link 25 has a first end and a second end, the first end being held by a lower portion of the base end 24 in such a manner that the first link 25 is rotatable about a lateral axis X1. The second link 26 has a first end and a second end, the first end being held by the second end of the first link 25 in such a manner that the second link 26 is rotatable about a lateral axis X2, the second end holding the corresponding travel wheel 2.

The base end 24 is in the form of a rectangular frame in a plan view. The base end 24 has an inner portion in the width direction relative to the body which inner portion is held by the outer pivotally holding bracket 21 of the corresponding body-side holder 17 with a rotary shaft 23 in-between in such a manner that the base end 24 is rotatable about the vertical axis Y. Each turning cylinder 18 has a first end and a second end, the first end being coupled to the corresponding inner pivotally holding bracket 22 in such a manner that the turning cylinder 18 is rotatable, the second end being coupled to a portion of the corresponding base end 24 which portion is lateral to the rotary shaft 23.

The first link 25 has a first end provided with a support shaft 27 held by the corresponding base end 24 in such a manner as to be rotatable relative to the base end 24. The first link 25 is, in other words, coupled to a lower portion of the corresponding base end 24 in such a manner as to be rotatable about the axis of the support shaft 27.

As illustrated in FIG. 8, the first link 25 includes a base-end-side arm 25*b* and an other-end-side arm 25*a*. The base-end-side arm 25*b* is integral with the first link 25, disposed at the first end of the first link 25, and extends obliquely in an upward and outward direction. The other-end-side arm 25*a* is integral with the first link 25, disposed at a second end of the first link 25, and extends obliquely in an upward and outward direction.

As illustrated in FIG. 7, the second link 26 includes a pair of left and right band plates 26*a* and 26*b* and has a substantial U shape in a plan view. The second link 26 is coupled at a portion to the first link 25 at which portion the plates 26*a* and 26*b* are apart from each other. The second link 26 is provided with a coupler shaft 28 disposed in an area between the plates 26*a* and 26*b*. The coupler shaft 28 is rotatably held by the second link 26 and couples the second link 26 to the corresponding first link 25. The second link 26 includes a swing-side end portion opposite to that portion at which the second link 26 is coupled to the first link 25, the swing-side end portion holding the corresponding travel wheel 2. As illustrated in FIG. 8, the swing-side end portion of the second link 26 includes an L-shaped extension 26A extending away from the body 1 in a substantial L shape. The L-shaped extension 26A has an extension-side end portion holding the corresponding travel wheel 2.

As illustrated in FIG. 6, the travel wheels 2 are held by the corresponding bendable link mechanisms 4 in such a manner as to be outward relative to the body in the left-right direction. Specifically, the travel wheels 2 are held by the respective swing-side end portions of the corresponding second links 26 in such a manner as to be outward relative to the body in the left-right direction. The hydraulic motors 6 are held by the respective swing-side end portions of the corresponding second links 26 in such a manner as to be inward relative to the body (that is, opposite to the corresponding travel wheels 2) in the left-right direction.

The orientation changers D correspond to the respective bendable link mechanisms 4, and are each configured to change the orientation of the corresponding bendable link mechanism 4 independently. The orientation changers D each include a turning cylinder 18 described above, a first hydraulic cylinder 29, and a second hydraulic cylinder 30. The first hydraulic cylinder 29 is configured to change the orientation of the corresponding first link 25 relative to the body 1. The second hydraulic cylinder 30 is configured to change the orientation of the corresponding second link 26 relative to the corresponding first link 25. The first and second hydraulic cylinders 29 and 30 are close to the corresponding first link 25 to form a group.

Each first link 25 and its corresponding first and second hydraulic cylinders 29 and 30 are between the plates 26*a* and 26*b* of the corresponding second link 26 in a plan view. The first hydraulic cylinder 29 is on the inner side of the corresponding first link 25 in the front-back direction of the body, and extends in the longitudinal direction of the first link 25. The first hydraulic cylinder 29 has a first end coupled in an interlocked manner to (i) a lower portion of the corresponding base end 24 with an arc-shaped first interlocking member 31 in-between and (ii) a base-end-side portion of the corresponding first link 25 with a second interlocking member 32 in-between. The first interlocking member 31 has an end portion pivotally coupled to an end portion of the corresponding second interlocking member 32 in such a manner that the first and second interlocking members 31 and 32 are rotatable relative to each other. The first hydraulic cylinder 29 has a second end coupled in an interlocked manner to the other-end-side arm 25*a* of the corresponding first link 25, which other-end-side arm 25*a* is integral with the first link 25.

The second hydraulic cylinder 30 is opposite to the first hydraulic cylinder 29, that is, on the outer side of the corresponding first link 25, in the front-back direction of the body, and extends substantially in the longitudinal direction of the first link 25. The second hydraulic cylinder 30 has a first end coupled in an interlocked manner to the base-end-side arm 25*b* of the corresponding first link 25, which base-end-side arm 25*b* is integral with the first link 25. The second hydraulic cylinder 30 has a second end coupled in an interlocked manner to an arm 35 of the corresponding second link 26 with a third interlocking member 34 in-between. The arm 35 is integral with the second link 26 at a base-end-side portion thereof. The second end of the second hydraulic cylinder 30 is also coupled in an interlocked manner to a swing-end-side portion of the corresponding first link 25 with a fourth interlocking member 36 in-between. The third interlocking member 34 has an end portion pivotally coupled to an end portion of the corresponding fourth interlocking member 36 in such a manner that the third and fourth interlocking members 34 and 36 are rotatable relative to each other.

Extending and contracting each first hydraulic cylinder 29 while the corresponding second hydraulic cylinder 30 is off causes the corresponding first link 25, second link 26, and travel wheel 2 to swing about a lateral axis X1 as an integral combination while maintaining their respective orientations relative to one another, the lateral axis X1 being at a position at which the combination is pivotally coupled to the corresponding base end 24. Extending and contracting each second hydraulic cylinder 30 while the corresponding first hydraulic cylinder 29 is off causes the corresponding second link 26 and travel wheel 2 to swing about a lateral axis X2 as an integral combination while maintaining the orientation of the first link 25, the lateral axis X2 being at a position at which the corresponding first and second links 25 and 26 are coupled to each other.

The auxiliary wheels 3 are each rotatably held by the corresponding bendable link mechanism 4 at its intermediate bendable portion. The auxiliary wheels 3 are each in the form of a wheel with an outer diameter substantially equal to that of each travel wheel 2. Each first link 25 and its corresponding second link 26 are pivotally coupled to each other with a coupler shaft 28, which protrudes outward in the width direction of the body relative to the second link 26. The auxiliary wheels 3 are each rotatably held by the corresponding coupler shaft 28 at its protrusion.

Figure 9:
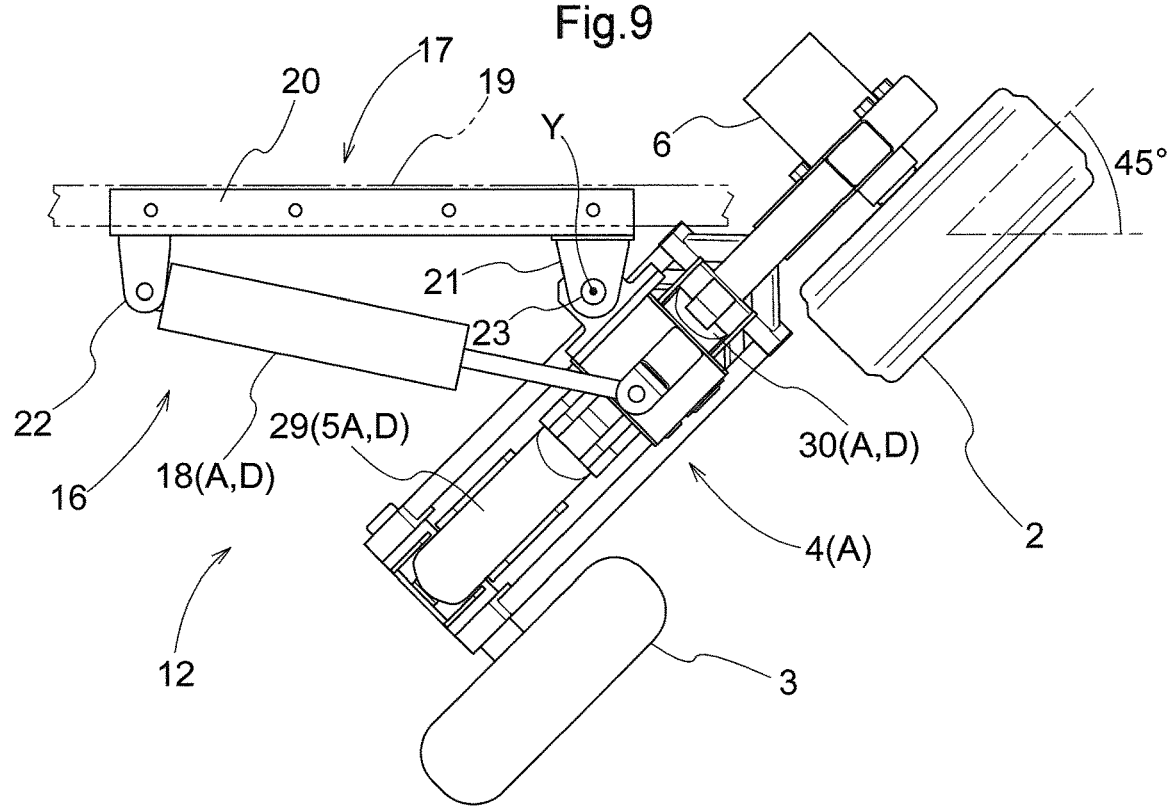
FIG. 9 is a plan view of a bendable link mechanism in a state for a left turn by means of a turning mechanism.
Figure 10:
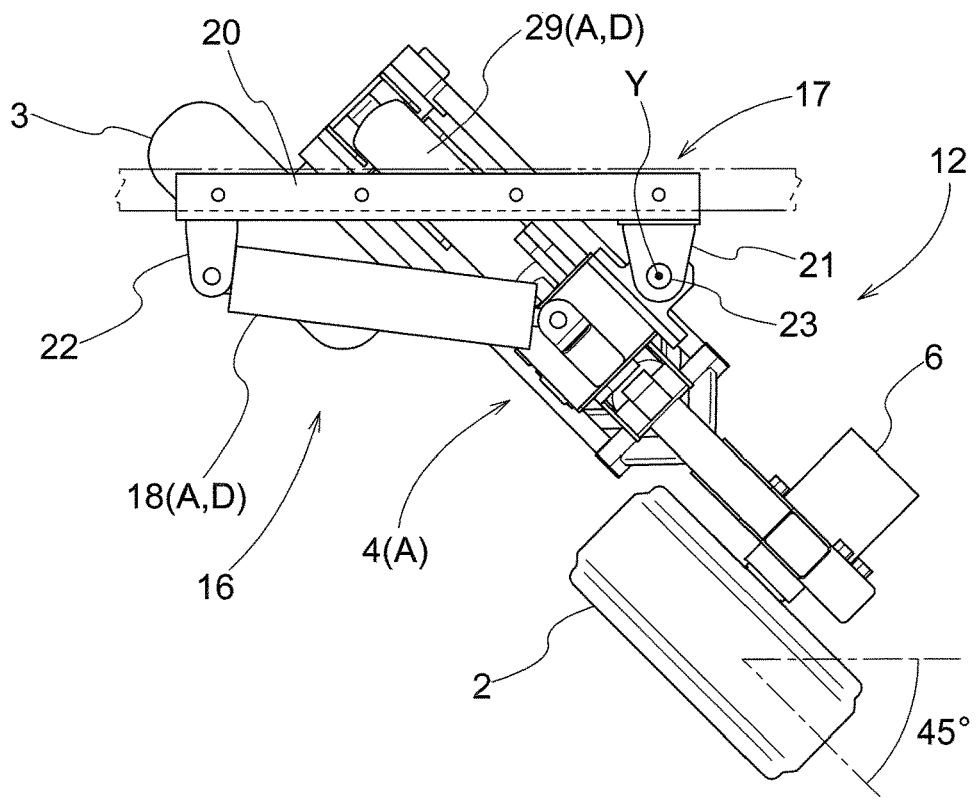
FIG. 10 is a plan view of a bendable link mechanism in a state for a right turn by means of a turning mechanism.

As illustrated in FIGS. 9 and 10, each outer pivotally holding bracket 21 holds an integral combination of the corresponding bendable link mechanism 4, travel wheel 2, auxiliary wheel 3, first hydraulic cylinder 29, and second hydraulic cylinder 30 in such a manner that the combination is rotatable about the vertical axis Y of the corresponding rotary shaft 23. Extending and contracting the corresponding turning cylinder 18 causes the combination to rotate in such a manner as to allow the travel wheel 2 to turn to the left and to the right each by approximately 45 degrees relative to the front-back direction for straight travel.

The hydraulic pressure source 8 is configured to supply operating oil through the valve mechanism 9 to the first and second hydraulic cylinders 29 and 30 of each bendable link mechanism 4. The valve mechanism 9 uses the hydraulic pressure control valves 11 to supply operating oil to and exhaust operating oil from the first and second hydraulic cylinders 29 and 30 for their extension and contraction. The hydraulic pressure control valves 11 are controlled by the ECU 13.

Those hydraulic pressure control valves 11 which correspond to the hydraulic motors 6 each adjust the flow rate of operating oil to change the rotation speed of the corresponding hydraulic motor 6, hence of the corresponding travel wheel 2. The hydraulic pressure control valves 11 are controlled by the ECU 13 on the basis of, for example, control information manually inputted or stored in advance.

[Sensors]

Figure 11:
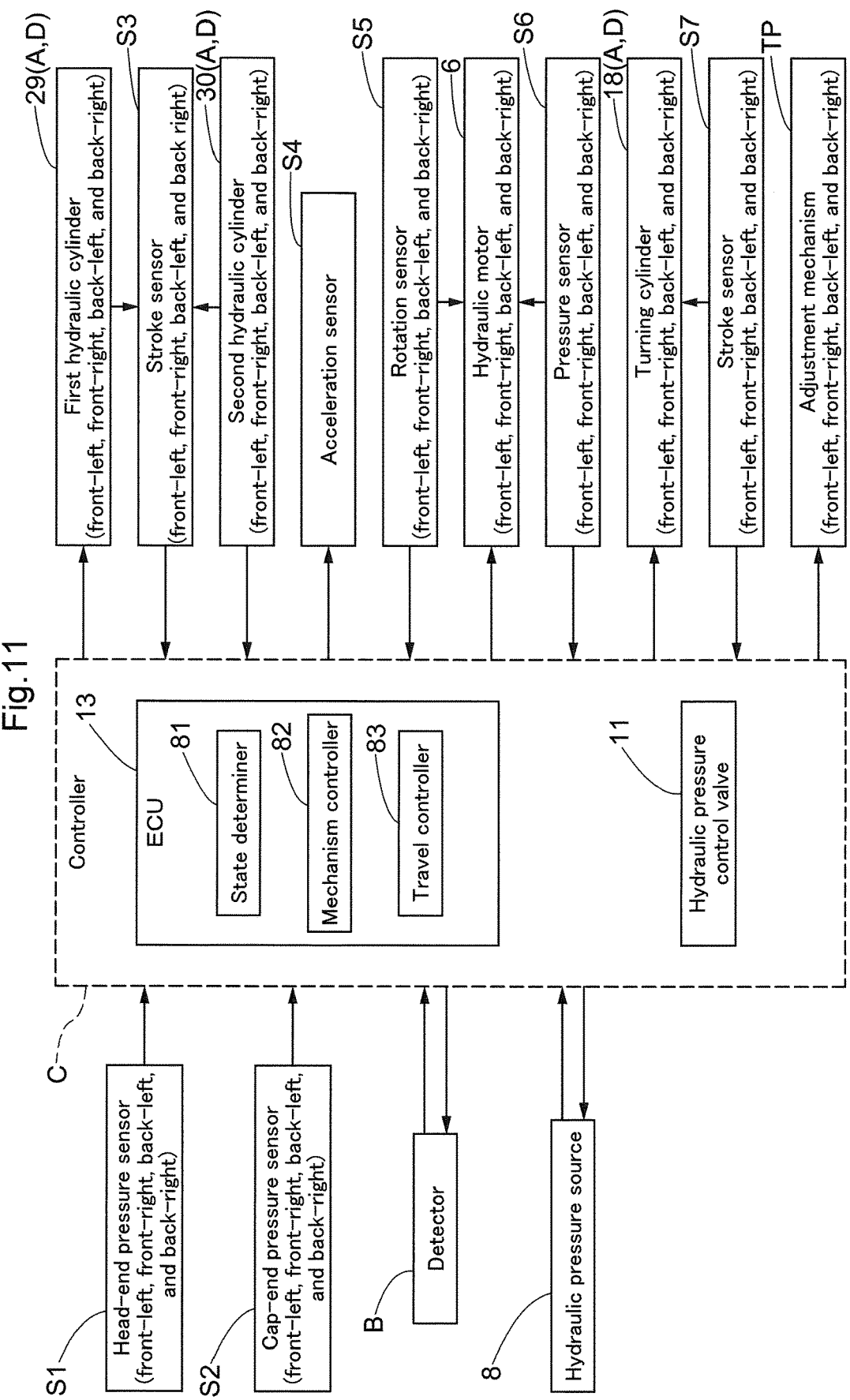
FIG. 11 is a control block diagram.

The work vehicle is provided with various sensors. Specifically, as illustrated in FIGS. 5 and 11, the work vehicle is provided with a head-end pressure sensor S1 and a cap-end pressure sensor S2 for each of the four second hydraulic cylinders 30. Each head-end pressure sensor S1 is configured to detect the hydraulic pressure in the head-end chamber of the corresponding second hydraulic cylinder 30. Each cap-end pressure sensor S2 is configured to detect the hydraulic pressure in the cap-end chamber of the corresponding second hydraulic cylinder 30. The pressure sensors S1 and S2 are each configured to transmit its detection result to the ECU 13.

As illustrated in FIG. 11, the work vehicle is provided with stroke sensors S3 configured to detect the respective amounts of extension and contraction of the four first hydraulic cylinders 29 and the four second hydraulic cylinders 30. The stroke sensors S3 are each configured to detect the amount of extension and contraction of its corresponding hydraulic cylinder 29, 30 as a value corresponding to the respective positions of the corresponding first and second links 25 and 26 as having been swung. The stroke sensors S3 are each configured to transmit its detection result to the ECU 13.

The pressure sensors S1 and S2 are not necessarily disposed at the positions mentioned above; the pressure sensors S1 and S2 each simply need be configured to detect (estimate) the hydraulic pressure in the corresponding one of the cap-end chamber and the head-end chamber. The pressure sensors S1 and S2 may each be disposed on a pipe between the valve mechanism 9 and the corresponding one of the cap-end chamber and the head-end chamber.

The controller C calculates from the detection results from the sensors S1 and S2 a thrust force necessity to support the body 1, and controls the supply of operating oil to the individual second hydraulic cylinders 30 on the basis of the result of the calculation.

As illustrated in FIGS. 5, 6 and 11, the body 1 is provided with an acceleration sensor S4 in the form of, for example, a triaxial acceleration sensor. The controller C determines the existence of a tilt in the front-back direction and the left-right direction on the basis of the result of detection by the acceleration sensor S4, and on the basis of the tilt, controls the orientation of the body 1, specifically, controls the supply of operating oil to the individual first and second hydraulic cylinders 29 and 30 so that the body 1 is oriented as intended.

As illustrated in FIGS. 5 and 11, the travel wheels 2 are each provided with a rotation sensor S5 configured to detect the speed at which the travel wheel 2 is rotating as driven by the corresponding hydraulic motor 6. The rotation sensors S5 are each configured to transmit its detection result to the ECU 13. The controller C, on the basis of the rotation speed of each travel wheel 2 detected by the corresponding rotation sensor S5, controls the supply (that is, the flow rate) of operating oil to the hydraulic motors 6 so that each travel wheel 2 rotates at an intended speed. The controller C controls the flow rate to control the rotation speed of each travel wheel 2.

As illustrated in FIG. 11, the work vehicle is provided with pressure sensors S6 each configured to detect the pressure of operating oil being supplied to the corresponding hydraulic motor 6. The pressure sensors S6 are each configured to transmit its detection result to the ECU 13. The controller C, on the basis of the pressure of operating oil detected by each pressure sensor S6, controls the supply (pressure) of operating oil to the hydraulic motors 6 so that each travel wheel 2 receives an intended drive torque. The controller C controls the pressure to control the drive torque for each travel wheel 2.

As illustrated in FIG. 11, the work vehicle is provided with stroke sensors S7 configured to detect the respective amounts of extension and contraction of the four turning cylinders 18. The stroke sensors S7 are each configured to detect the amount of extension and contraction of its corresponding turning cylinder 18 as a value corresponding to the position of the corresponding bendable link mechanism 4 as having been rotated. The stroke sensors S7 are each configured to transmit its detection result to the ECU 13.

As illustrated in FIG. 11, the work vehicle is provided with adjustment mechanisms TP each configured to adjust the respective air pressures of its corresponding travel wheel 2 and auxiliary wheel 3. The adjustment mechanisms TP are each in the form of, for example, a combination of an electrically operated air pump and air valve. The adjustment mechanisms TP are each configured to increase or decrease the respective air pressures of its corresponding travel wheel 2 and auxiliary wheel 3 under control of the controller C (specifically, the ECU 13).

As described above, the work vehicle as the present embodiment is configured to change the orientation of each bendable link mechanism 4 with use of the corresponding hydraulically drivable orientation changer D, which includes a turning cylinder 18 and hydraulic cylinders 29 and 30. Further, the work vehicle is configured to travel as driven with use of the hydraulic motors 6. The work vehicle is thus not susceptible to moisture, fine dust, or the like, and is suitable for agricultural work.

[ECU]

As illustrated in FIG. 11, the ECU 13 includes a state determiner 81, a mechanism controller 82, and a travel controller 83. The ECU 13 includes a memory and a CPU. The memory (not illustrated in the drawings) is, for example, a HDD or a nonvolatile RAM, and stores programs corresponding to the functional sections. The CPU (not illustrated in the drawings) is configured to execute the programs to cause the functional sections to each perform its function.

The state determiner 81 is configured to determine the state of the travel surface on the basis of an image from the detector B. Specifically, the state determiner 81 analyzes an image that the detector B has generated of the travel surface, and thereby determines the state of the travel surface (for example, the size of an unevenness on the travel surface and the steepness and direction of a slope). The state determiner 81 may include a neural network configured to receive an image that the detector B has generated of the travel surface and output information on the state of the travel surface. The neural network has been constructed through machine learning based on training images as a large number of images captured of travel surfaces and the state of the travel surface in each image.

The state determiner 81 is also configured to determine on the basis of an image from the detector B whether there is an obstacle forward in the direction in which the work vehicle is traveling. Specifically, the state determiner 81 analyzes an image that the detector B has generated of the travel surface, and thereby determines whether there is an obstacle (for example, a rock, a fallen tree, an animal, or a person). The state determiner 81 may include a neural network configured to receive an image that the detector B has generated of the travel surface and output information on whether there is an obstacle. The neural network has been constructed through machine learning based on training data of a large number of images captured of travel surfaces and whether there is an obstacle in each image.

The mechanism controller 82 is configured to, on the basis of the state of the travel surface and whether there is an obstacle as determined by the state determiner 81, operate the hydraulic pressure control valves 11 to move each travel wheel 2 relative to the body 1.

The mechanism controller 82 operates the hydraulic pressure control valves 11, for instance, in such a manner that the body 1 becomes apart from the travel wheels 2 by a larger distance in the up-down direction relative to the vehicle in response to the detector B detecting a larger unevenness on the travel surface. FIG. 1 illustrates an example of the mechanism controller 82 operating the hydraulic pressure control valves 11 to extend each second hydraulic cylinder 30. This causes the corresponding second link 26 and travel wheel 2 to swing about a lateral axis X2, thereby changing the respective orientations of the holder mechanisms A from the state illustrated on the left side in the drawing to the state on the right side.

The mechanism controller 82 operates the hydraulic pressure control valves 11, for instance, in such a manner that the body 1 becomes apart from the travel wheels 2 by a larger distance in the front-back direction relative to the vehicle in response to the detector B detecting a larger unevenness on the travel surface. FIG. 2 illustrates an example of the mechanism controller 82 operating the hydraulic pressure control valves 11 to extend each first hydraulic cylinder 29 and each second hydraulic cylinder 30. This causes the corresponding first link 25 to swing about a lateral axis X1 and the corresponding second link 26 and travel wheel 2 to swing about a lateral axis X2, thereby changing the respective orientations of the holder mechanisms A from the state illustrated on the left side in the drawing to the state on the right side.

The mechanism controller 82 operates the hydraulic pressure control valves 11, for instance, in such a manner that the body 1 becomes apart from the travel wheels 2 by a larger distance in the left-right direction relative to the vehicle in response to the detector B detecting a larger unevenness on the travel surface. FIG. 3 illustrates an example of the mechanism controller 82 operating the hydraulic pressure control valves 11 to contract the front-left and front-right turning cylinders 18. This causes the front-left and front-right bendable link mechanisms 4 and travel wheels 2 to swing about respective vertical axes Y, thereby changing the respective orientations of the holder mechanisms A from the state illustrated on the left side in the drawing to the state on the right side.

The mechanism controller 82 operates the hydraulic pressure control valves 11, for instance, in such a manner that the respective rotation axes 2a of the travel wheels 2 are not orthogonal to the sloping direction AS of the travel surface. FIG. 4 illustrates an example of the mechanism controller 82 operating the hydraulic pressure control valves 11 to contract each turning cylinder 18. This causes the corresponding bendable link mechanism 4 and travel wheel 2 to swing about a vertical axis Y, thereby changing the respective orientations of the holder mechanisms A from the state illustrated on the left side in the drawing to the state on the right side.

The mechanism controller 83, in response to, for instance, determining that the work vehicle needs to brake suddenly, operates the hydraulic pressure control valves 11 to contract each turning cylinder 18. This causes the corresponding bendable link mechanism 4 and travel wheel 2 to swing about a vertical axis Y, so that the respective rotation axes 2a of the travel wheels 2 are not orthogonal to the direction in which the work vehicle is traveling.

The travel controller 83 is configured to control how the work vehicle travels (that is, travel forward or backward, stop, or turn). Specifically, the travel controller 83 operates the hydraulic pressure control valves 11 to control the supply of operating oil to the hydraulic motors 6 and the turning cylinders 18. The travel controller 83 controls how the work vehicle travels on the basis of, for example, a manually inputted travel instruction. The travel controller 83 may operate the hydraulic pressure control valves 11 to control how the work vehicle travels in such a manner that the work vehicle travels on a preset autonomous travel path.

[Orientation Changing Process]

The description below deals with how the ECU 13 performs an orientation changing process with reference to the flowchart in FIG. 12. The ECU 13 repeats the orientation changing process while the work vehicle is traveling.

First, the detector B captures an image of the travel surface to generate image data, and transmits the image data to the ECU 13 (step #01).

The state determiner 81 receives the image data from the detector B, and analyzes the image to determine the state of the travel surface (step #02). If the state determiner 81 has determined that the travel surface has an unevenness ("Yes" in step #02), the mechanism controller 82 operates each orientation changer D to move the corresponding travel wheel 2 (step #03).

If "No" in step #02, or after step #03, the mechanism controller 82 determines whether the work vehicle needs to take a measure for a slope (step #04). The measure for a slope refers to a step of controlling the holder mechanisms A in such a manner that the respective rotation axes 2a of the travel wheels 2 are not orthogonal to the sloping direction AS of the travel surface. Specifically, the mechanism controller 82 determines whether the work vehicle needs to take a measure for a slope, on the basis of (i) the state of the travel surface as determined by the state determiner 81 and (ii) the state of how the work vehicle is traveling under control of the travel controller 83. The mechanism controller 82 determines that the work vehicle needs to take a measure for a slope if, for instance, the travel surface is sloped, and the work vehicle needs to stop or travel slowly.

If the mechanism controller 82 has determined that the work vehicle needs to take a measure for a slope ("Yes" in step #04), the mechanism controller 82 operates each orientation changer D to move the corresponding holder mechanism A in such a manner that the respective rotation axes 2*a* of the travel wheels 2 are not orthogonal to the sloping direction AS of the travel surface (see FIG. 4) (step #05). If "No" in step #04, or after step #05, the orientation changing process ends.

The orientation changing process may further include (i) a step of the mechanism controller 82 determining whether the work vehicle needs to take a measure for sudden braking and (ii) a step of, if the mechanism controller 82 has determined that the work vehicle needs to take a measure for sudden braking, the mechanism controller 82 taking a measure for sudden braking, the measure including moving each holder mechanism A in such a manner that the respective rotation axes 2*a* of the travel wheels 2 are not orthogonal to the direction in which the work vehicle is traveling.

[Variations]
(1) FIGS. 1 and 2 each illustrate the front travel wheels 2 being moved by a distance equal to the distance by which the rear travel wheels 2 are moved. The work vehicle may be configured to move only the front travel wheels 2 or only the rear travel wheels 2 or to move the front travel wheels 2 by a first distance relative to the body 1 and the rear travel wheels 2 by a second distance relative to the body 1, the second distance being different from the first distance.

(2) FIG. 3 illustrates the front travel wheels 2 being moved by an equal distance. The work vehicle may be configured to move only the front travel wheels 2 or only the rear travel wheels 2 or to move the front travel wheels 2 by a first distance relative to the body 1 and the rear travel wheels 2 by a second distance relative to the body 1, the second distance being different from the first distance.

(3) FIG. 4 illustrates the respective rotation axes 2*a* of all the travel wheels 2 being not orthogonal to the sloping direction AS of the travel surface. The work vehicle may be configured for an orientation change such that the respective rotation axes 2*a* of at least one travel wheel 2, namely the two front ones, the two rear ones, the two right ones, or the two left ones, are not orthogonal to the sloping direction AS of the travel surface.

(4) The holder mechanisms A are not necessarily configured as described above; for instance, the holder mechanisms A may each include a single link or three or more links. The work vehicle may include holder mechanisms A for only two travel wheels 2 (for example, the front ones or the rear ones).

(5) The orientation changers D are not necessarily configured as described above; for instance, the orientation changers D may each include an electrically operated actuator.

(6) The travel wheels 2 may be drivable by an electric motor, an engine, or the like.

(7) The detector B may be in the form of, for example, an ultrasonic sensor or a millimeter-wave radar.

(8) The detector B is not necessarily disposed at a front end portion of the body 1, but may be disposed on an upper surface, a lower surface, a side surface, or a back surface of the body 1. The work vehicle may include a plurality of detectors B at different positions.

(9) The mechanism controller 82 may be configured to (i) determine, on the basis of the size of an unevenness on the travel surface and the current ground clearance (that is, the distance between the lower end of the body 1 and the travel surface), whether the body 1 will likely come into contact with the travel surface and (ii) in response to determining that the body 1 will likely come into contact with the travel surface, operate each holder mechanism A in such a manner that the body 1 is apart from the travel wheels 2 by a larger distance in the front-back direction relative to the vehicle.

INDUSTRIAL APPLICABILITY

The present invention is applicable to a work vehicle designed to travel on a highly uneven travel surface.

REFERENCE SIGNS LIST

1 Body
2 Travel wheel
2*a* Rotation axis
4 Bendable link mechanism
6 Hydraulic motor
29 First hydraulic cylinder
30 Second hydraulic cylinder
A Holder mechanism
AS Sloping direction
B Detector (obstacle detector)
C Controller
D Orientation changer

The invention claimed is:
1. A work vehicle, comprising:
a body;
a plurality of travel wheels at front and back portions of the body on each of left and right sides;
a plurality of holder mechanisms held by the body and holding the respective travel wheels in such a manner as to be capable of moving the travel wheels independently of one another relative to the body;
a detector configured to detect a state of a travel surface; and
a controller configured to, based on the state that the detector has detected, control the holder mechanisms to move the travel wheels relative to the body.

2. The work vehicle according to claim 1, wherein:
the controller controls the holder mechanisms in such a manner that the body becomes apart from the travel wheels by a distance in an up-down direction relative to the vehicle in response to the detector detecting an unevenness on the travel surface, wherein the distance is increased in response to detecting the unevenness as being increased.

3. The work vehicle according to claim 2, wherein:
the distance in the up-down direction is larger than the unevenness.

4. The work vehicle according to claim 1, wherein:
the holder mechanisms each comprise:
a bendable link mechanism; and
an orientation changer configured to change an orientation of the bendable link mechanism independently, wherein the bendable link mechanism has a leading end provided with a corresponding one of the travel wheels, and wherein the controller controls the orientation changers.

5. The work vehicle according to claim 4, further comprising:

a plurality of hydraulic motors each disposed at the leading end of a corresponding one of the bendable link mechanisms and configured to drive a corresponding one of the travel wheels, and wherein the orientation changers each comprise a hydraulic cylinder.

6. The work vehicle according to claim 1, wherein:

the controller controls the holder mechanisms in such a manner that the body becomes apart from the travel wheels by a distance in a front-back direction relative to the vehicle in response to the detector detecting an unevenness on the travel surface, and the distance is larger as the unevenness is larger.

7. The work vehicle according to claim 1, wherein:

the controller controls the holder mechanisms in such a manner that the body becomes apart from the travel wheels by a distance in a left-right direction relative to the vehicle in response to the detector detecting an unevenness on the travel surface, and the distance is larger as the unevenness is larger.

8. The work vehicle according to claim 1, wherein:

the holder mechanisms are each configured to change a direction of a rotation axis of a corresponding one of the travel wheels independently, and the controller controls the holder mechanisms in such a manner that the respective rotation axes of the travel wheels are not orthogonal to a sloping direction of the travel surface.

9. The work vehicle according to claim 1, wherein:

the detector is a camera configured to capture an image of the travel surface.

10. The work vehicle according to claim 1, further comprising:

an obstacle detector configured to detect an obstacle forward in a direction in which the work vehicle is traveling, wherein the holder mechanisms are each configured to change a direction of a rotation axis of a corresponding one of the travel wheels independently, and wherein the controller is configured to, in response to the obstacle detector detecting an obstacle forward in the direction in which the work vehicle is traveling, control the holder mechanisms in such a manner that the respective rotation axes are not orthogonal to the direction in which the work vehicle is traveling.

11. A work vehicle, comprising:

a body;

a plurality of travel wheels at front and back portions of the body on each of left and right sides;

a plurality of holder mechanisms held by the body and holding the respective travel wheels in such a manner as to be capable of moving (i) the travel wheels independently of one another relative to the body and (ii) respective rotation axes of the travel wheels independently of one another;

an obstacle detector configured to detect an obstacle forward in a direction in which the work vehicle is traveling; and a controller configured to, in response to the obstacle detector detecting an obstacle forward in the direction in which the work vehicle is traveling, control the holder mechanisms in such a manner that the respective rotation axes are not orthogonal to the direction in which the work vehicle is traveling.

* * * * *